(12) United States Patent
Naono et al.

(10) Patent No.: US 9,702,698 B2
(45) Date of Patent: Jul. 11, 2017

(54) ANGULAR VELOCITY SENSOR AND MANUFACTURING METHOD THEREFOR

(71) Applicant: FUJIFILM Corporation, Tokyo (JP)

(72) Inventors: Takayuki Naono, Kanagawa (JP); Takuma Nakano, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 120 days.

(21) Appl. No.: 14/809,941

(22) Filed: Jul. 27, 2015

(65) Prior Publication Data

US 2015/0330785 A1    Nov. 19, 2015

Related U.S. Application Data

(63) Continuation of application No. PCT/JP2014/051929, filed on Jan. 29, 2014.

(30) Foreign Application Priority Data

Feb. 4, 2013  (JP) .................. 2013-019736

(51) Int. Cl.
*G01C 19/56* (2012.01)
*G01P 15/09* (2006.01)
(Continued)

(52) U.S. Cl.
CPC .......... *G01C 19/5712* (2013.01); *G01C 19/56* (2013.01); *G01C 25/00* (2013.01); *G01P 15/09* (2013.01); *G01P 15/097* (2013.01)

(58) Field of Classification Search
CPC  G01C 19/56; G01C 19/5712; G01C 19/5684; G01P 15/18; G01P 15/0922; G01P 15/09; G01P 15/097
See application file for complete search history.

(56) References Cited

U.S. PATENT DOCUMENTS 6,282,956 B1* 9/2001 Okada .................... G01C 19/56
                                                73/504.12
2003/0084723 A1* 5/2003 Kikuchi ............. G01C 19/5607
                                                73/504.12
(Continued)

FOREIGN PATENT DOCUMENTS

JP     2005-345245 A    12/2005
JP     2006-153481 A     6/2006
(Continued)

OTHER PUBLICATIONS

The extended European search report issued by the European Patent Office on Jan. 13, 2016, which corresponds to European Patent Application No. 14746045.5 and is related to U.S. Appl. No. 14/809,941.

(Continued)

*Primary Examiner* — Helen Kwok
(74) *Attorney, Agent, or Firm* — Studebaker & Brackett PC

(57) ABSTRACT

One or more vibration plate layers of a diaphragm part are formed by a thin film forming technique. When a resonance frequency in a resonance vibration mode calculated from dimensions of a structure of an angular velocity sensor and an elastic parameter of a material thereof is defined as f kilohertz, a mass of a weight part is defined as M milligrams, a circumference of the diaphragm part is defined as r meters, a stress applied to a piezoelectric layer is defined as $\sigma_p$ pascals, a thickness thereof is defined as $t_p$ meters, a stress applied to an n-th layer from the weight part in a vibration plate portion constituted by a plurality of layers including a lower electrode and the vibration plate layers is defined as $\sigma_n$ pascals, and a thickness thereof is defined as $t_n$ meters (where n is a natural number), $T_{eff}$ expressed by $T_{eff}=r(\sigma_p t_p +$ (Continued)

$\Sigma\sigma_n t_n)/M$ satisfies $\{(-0.36f^2+210)/33\} \leq T_{eff} \leq \{(0.44f^2+210)/33\}$.

12 Claims, 11 Drawing Sheets

(51) Int. Cl.
  *G01C 19/5712* (2012.01)
  *G01P 15/097* (2006.01)
  *G01C 25/00* (2006.01)

(56) References Cited

U.S. PATENT DOCUMENTS

| | | | | |
|---|---|---|---|---|
| 2004/0221651 A1* | 11/2004 | Schiller | ............ | G01C 19/56 73/514.34 |
| 2007/0256495 A1* | 11/2007 | Watson | ............ | G01C 19/56 73/504.12 |
| 2008/0148846 A1* | 6/2008 | Whelan | ............ | G01C 19/5684 73/504.12 |
| 2010/0058861 A1* | 3/2010 | Kuang | ............ | G01C 19/5677 73/504.12 |
| 2011/0041606 A1* | 2/2011 | Ikeda | ............ | G01C 19/5684 73/504.12 |
| 2012/0043855 A1 | 2/2012 | Kang et al. | | |
| 2013/0038666 A1 | 2/2013 | Harigai et al. | | |

FOREIGN PATENT DOCUMENTS

| | | |
|---|---|---|
| JP | 2006-194911 A | 7/2006 |
| JP | 4012232 A | 9/2007 |
| JP | 4012232 B2 | 9/2007 |
| JP | 2010-145122 A | 7/2010 |
| JP | 2010-160095 A | 7/2010 |
| WO | 2012/026107 A1 | 3/2012 |

OTHER PUBLICATIONS

Notification of Transmittal of Translation of the International Preliminary Report on Patentability and Translation of Written Opinion of the International Searching Authority; PCT/JP2014/051929 issued on Aug. 13, 2015.

International Search Report for application No. PCT/JP2014/051929 dated Apr. 15, 2014.

* cited by examiner

HORIZONTAL DIRECTION (X-DIRECTION) RESONANCE VIBRATION

FIG.12

| | VIBRATION PLATE LAYER 1 | VIBRATION PLATE LAYER 2 | VIBRATION PLATE LAYER 3 | $\phi_c / \phi_m / h$ (μm) | PZT FILM THICKNESS (μm) | RADIUS OF CURVATURE (m) AFTER FORMING PZT | AVERAGE STRESS σ ave. (MPa) | Teff (N/mg) |
|---|---|---|---|---|---|---|---|---|
| EXPERIMENT 1 | DLC/3.5μm | Ir/0.15μm | NA | 1000/400/400 | 1.5 | 4.7 | 205 | 27.5 |
| EXPERIMENT 2 | DLC/3.5μm | Ir/0.15μm | NA | 1000/400/400 | 2.0 | 4.4 | 199 | 29.4 |
| EXPERIMENT 3 | THERMALLY OXIDIZED SiO$_2$/0.1μm | Poly-Si/0.5μm | Ir/0.15μm | 1000/400/400 | 2.2 | 15.0 | 121 | 8.6 |
| EXPERIMENT 4 | THERMALLY OXIDIZED SiO$_2$/0.1μm | Poly-Si/0.5μm | Ir/0.15μm | 1000/400/400 | 2.3 | 14.1 | 124 | 9.1 |
| EXPERIMENT 5 | THERMALLY OXIDIZED SiO$_2$/1μm | Ti/4.1μm | Ir/0.15μm | 1000/400/400 | 2.1 | 1.9 | 409 | 68.0 |
| EXPERIMENT 6 | THERMALLY OXIDIZED SiO$_2$/1μm | Ti/4.3μm | Ir/0.15μm | 1000/400/400 | 1.8 | 1.6 | 488 | 80.3 |
| EXPERIMENT 7 | THERMALLY OXIDIZED SiO$_2$/1μm | Ti/4.1μm | Ir/0.15μm | 1000/400/400 | 2.2 | 1.8 | 423 | 72.2 |
| EXPERIMENT 8 | TEOS-SiO$_2$/2.8μm | Ir/0.15μm | NA | 800/400/400 | 2.0 | 35.0 | 23 | 3.2 |
| EXPERIMENT 9 | TEOS-SiO$_2$/2.8μm | Ir/0.15μm | NA | 700/300/300 | 2.0 | 23.0 | 25 | 3.0 |
| EXPERIMENT 10 | TEOS-SiO$_2$/2.8μm | Ir/0.15μm | NA | 700/300/300 | 2.0 | 13.0 | 43 | 5.2 |
| EXPERIMENT 11 | THERMALLY OXIDIZED SiO$_2$/1μm | TiW/3.7μm | Ir/0.15μm | 1000/400/400 | 2.3 | 2.9 | 279 | 44.9 |

FIG.13

| | DESIGN VALUE | | EXPERIMENT RESULTS | | | |
|---|---|---|---|---|---|---|
| | $fz(kHz)$ | $fx(kHz)$ | $fz'(kHz)$ | $fx'(kHz)$ | $\downarrow fz'^2 - fz^2$ $\Delta fz^2$ | $\downarrow fx'^2 - fx^2$ $\Delta fx^2$ |
| EXPERIMENT 1 | 25.0 | 26.0 | 39.6 | 36.0 | 943.2 | 617.1 |
| EXPERIMENT 2 | 30.5 | 31.5 | 45.2 | 40.9 | 1111.9 | 676.5 |
| EXPERIMENT 3 | 7.3 | 7.6 | 11.7 | 9.9 | 83.3 | 40.5 |
| EXPERIMENT 4 | 7.3 | 7.6 | 12.2 | 11.2 | 95.9 | 68.2 |
| EXPERIMENT 5 | 22.3 | 23.6 | 59.9 | 54.6 | 3085.1 | 2423.6 |
| EXPERIMENT 6 | 23.5 | 24.5 | 62.8 | 56.8 | 3389.8 | 2632.5 |
| EXPERIMENT 7 | 21.2 | 22.4 | 63.3 | 56.4 | 3560.4 | 2681.9 |
| EXPERIMENT 8 | 25.8 | 28.5 | 23.7 | 26.1 | -105.5 | -128.1 |
| EXPERIMENT 9 | 31.4 | 31.1 | 29.6 | 29.0 | -106.0 | -128.6 |
| EXPERIMENT 10 | 31.4 | 31.1 | 30.7 | 30.0 | -40.5 | -67.1 |
| EXPERIMENT 11 | 24.7 | 27.0 | 48.4 | 45.0 | 1732.8 | 1289.8 |

ANGULAR VELOCITY SENSOR AND MANUFACTURING METHOD THEREFOR

CROSS-REFERENCE TO RELATED APPLICATIONS

This application is a continuation of PCT International Application No. PCT/JP2014/051929 filed on Jan. 29, 2014, which claims priority under 35 U.S.C. §119(a) to Japanese Patent Application No. 2013-019736 filed on Feb. 4, 2013. Each of the above applications is hereby expressly incorporated by reference, in their entirety, into the present application.

BACKGROUND OF THE INVENTION

Field of the Invention

The present invention relates to an angular velocity sensor and a manufacturing method thereof, and in particular to an angular velocity sensor of a vibration gyro type having a structure in which a weight is supported by a piezoelectric diaphragm, and a manufacturing technique thereof.

Description of the Related Art

A MEMS (Micro Electro Mechanical System) vibrating gyrosensor using a silicon (Si) fine-processing technique has features such as being small in size and of low power consumption and various applications thereof including especially mobile applications and the like are expected. A typical MEMS vibrating gyrosensor takes a structure in which a portion serving as a weight is supported by a vibration spring, so that the gyrosensor causes the weight to vibrate by a driving force and detects a Coriolis force that occurs when an angular velocity is externally applied, and thereby performs angular velocity detection (see Japanese Patent Application Laid-Open No. 2010-160095 (PTL 1) and Japanese Patent No. 4012232 (PTL 2)).

For example, an angular velocity sensor proposed in PTL 1 has a structure in which a weight is supported by a piezoelectric diaphragm, and is configured to cause the weight to make resonance vibration driving by directing the weight in a vertical (z-resonance driving) direction and a horizontal (x-resonance driving) direction, and thereby detects an angular velocity. In addition, an angular velocity sensor proposed in PTL 2 detects an angular velocity of three axes (x-axis, y-axis, and z-axis) by causing a weight (heavy weight body) to make circulating movement along a circulation orbit. This structure is small-sized and has an advantage of being capable of detecting angular velocities about all of the three axes.

SUMMARY OF THE INVENTION

In manufacturing of an angular velocity sensor having a structure as proposed in PTL 1 and PTL 2, conventionally, a SOI (Silicon On Insulator) substrate is generally used. The SOI substrate has a multilayer structure in which a thin silicon layer (device layer) is laminated via a $SiO_2$ layer on a relatively thick silicon substrate (handle layer), and the portion of the device layer eventually becomes a vibration plate of a diaphragm. A thickness of the diaphragm may vary depending on the device designs, so that an appropriate thickness of the device layer is selected in accordance with the designs.

However, since the a SOI wafer is produced in a complex process of bonding two silicon (Si) substrates, polishing the silicon substrates, and thereby adjusting the thickness of the device layer, there is a problem that the SOI wafer requires considerably increased cost relative to a conventional Si wafer, causing increase in the device cost. In addition, when it is attempted to achieve further miniaturization of the device while maintaining a resonance frequency of the angular velocity sensor, it is necessary to reduce the dimension of the diaphragm diameter and at the same time reduce the thickness of the diaphragm.

However, in the process using the SOI wafer, due to the problem of polishing techniques, it is difficult to make the device layer thickness uniformly thin. Since unevenness in the order of ±0.5 micrometer (µm) generally exists in the device layer thickness due to the limitation resulting from polishing accuracy, the unevenness of the film thickness increases by ±10% or more in response to the thickness of the device layer becoming 5 micrometers (µm) or less. Since the thickness of the diaphragm considerably affects the resonance frequency, deviation (error) of the actual resonance frequency with reference to the design resonance frequency of the angular velocity sensor exceeds an allowable range in response to the unevenness of the film thickness becoming ±10% or more, making it difficult to realize practical mass production. In other words, there are limits to miniaturization of the angular velocity sensor in the process using the conventional SOI wafer. In the meantime, further miniaturization of the device of the angular velocity sensor is desirable in view of the recent trends of miniaturization and thinning of mobile devices.

The present invention has been made in view of such a circumstance, and an object of the present invention is to provide an angular velocity sensor that can solve the above-identified problems, can be manufactured with cost reduced relative to that of a conventional angular velocity sensor, and enables further miniaturization thereof, and a manufacturing method thereof.

In order to achieve the above object, the following aspects of the invention are provided.

(First Aspect): An angular velocity sensor according to a first aspect is an angular velocity sensor that includes a flexible diaphragm part including a laminated structure, the laminated structure of the diaphragm part including an upper electrode including a driving electrode part and a detection electrode part, the driving electrode part and the detection electrode part being pattern-arranged, a piezoelectric layer, a lower electrode, and one or more vibration plate layers; a pedestal section supporting an outer circumference of the diaphragm part; and a weight section joined to a central part of the diaphragm part, the angular velocity sensor being adapted to cause the weight section to vibrate using an inverse piezoelectric effect of a piezoelectric body by applying an electric field to the piezoelectric layer via the driving electrode part, and detect a displacement generated in the weight section on the basis of a Coriolis force, the displacement being detected by a piezoelectric effect from the detection electrode part, the vibration plate layer being formed by a thin film forming technique; and when a resonance frequency in a resonance vibration mode calculated from dimensions of a structural body of the angular velocity sensor and an elastic parameter of a material of the structural body is f (in units of kilohertz [kHz]), a mass of the weight section is M (in units of milligrams [mg]), a circumferential length of the diaphragm part is r (in units of meters [m]), a stress acting on the piezoelectric layer is $\sigma_p$ (in units of pascals [Pa]), a film thickness of the piezoelectric layer is $t_p$ (in units of meters [m]), a stress acting on an n-th layer of a vibration plate portion constituted by a plurality of layers including the lower electrode and the one or more vibration plate layers is $\sigma_n$ (in units of pascals [Pa]), the n-th layer being n-th from a side of the weight section, and a film thickness of the n-th layer being $t_n$ (in units of meters [m]) (where n is a natural number), then $T_{\mathit{eff}}$ expressed by the expression:

[Math 1]

$$T_{\mathit{eff}} = \frac{r\left(\sigma_p t_p + \sum_n \sigma_n t_n\right)}{M}$$

satisfies:

[Math 2]

$$\frac{-0.36 f^2 + 210}{33} \leq T_{\mathit{eff}} \leq \frac{0.44 f^2 + 210}{33}.$$

In accordance with the first aspect, the layer of the diaphragm part functioning as a vibration plate is formed by a thin film forming technique. As an indicator for evaluating a deviation (an amount of shift) of the resonance frequency with reference to a design value as a result of an effect of residual stresses of each of the layers that are formed, $T_{\mathit{eff}}$ defined by the [Math 1] is introduced.

$T_{\mathit{eff}}$ corresponds to a value obtained by dividing energy of tension due to a stress of the diaphragm part having multi-layer structure by the mass M of the weight section, and is associated with the amount of shift of the resonance frequency due to the stress of the diaphragm part. From the knowledge based on experiments, the shift of the resonance frequency from the design value f can be maintained within an allowable range of ±20% by determining the stresses and the film thicknesses of each of the layers such that Ten falls within a range where the relationship of [Math 2] holds.

In accordance with the first aspect, manufacturing can be performed using a conventional silicon substrate or the like without using an SOI substrate, so that manufacturing at low cost relative to that of a conventional angular velocity sensor can be performed. In addition, thin films having less unevenness in the film thicknesses can be formed with accuracy by the thin film forming technique, so that further film-thinning and miniaturization of a device is possible when compared with a conventional configuration.

(Second Aspect): In the angular velocity sensor according to the first aspect, a configuration is possible in which the following expression is satisfied:

[Math 3]

$$\frac{-0.28 f^2 + 210}{33} \leq T_{\mathit{eff}} \leq \frac{0.32 f^2 + 210}{33}.$$

The shift of the resonance frequency from the design value f can be maintained within an allowable range of ±15% by determining the stresses and the film thicknesses of each of the layers such that $T_{\mathit{eff}}$ falls within a range where the relationship of [Math 3] holds.

(Third Aspect): In the angular velocity sensor according to the first aspect, a configuration is possible in which the following expression is satisfied:

[Math 4]

$$\frac{-0.19 f^2 + 210}{33} \leq T_{\mathit{eff}} \leq \frac{0.21 f^2 + 210}{33}.$$

The shift of the resonance frequency from the design value f can be maintained within an allowable range of ±10% by determining the stresses and the film thicknesses of each of the layers such that $T_{\mathit{eff}}$ falls within a range where the relationship of [Math 4] holds.

(Fourth Aspect): In the angular velocity sensor according to any one of the first aspect to the third aspect, a configuration is possible in which a thickness of the vibration plate layer is equal to or less than 5 micrometers (μm).

Miniaturization of the diaphragm is achieved in proportion to reduction in the total film thickness of the vibration plate portion.

(Fifth Aspect): In the angular velocity sensor according to any one of the first aspect to the fourth aspect, a configuration is possible in which a vibration mode having the resonance frequency f is a mode of vibration in which the weight section makes translational movement in a film thickness direction.

(Sixth Aspect): In the angular velocity sensor according to any one of the first aspect to the fifth aspect, a configuration is possible in which the vibration plate is a film formed by gas phase film forming.

Since a gas phase film forming method is suitable for forming a thin film of 5 μm or less, the aspect of the present invention is particularly useful in achieving film-thinning of 5 μm or less which is difficult to produce in a conventional configuration using an SOI substrate. In accordance with the aspect of the present invention, a total film thickness of the vibration plate portion can be further made thinner than 5 μm, and an aspect that makes the film thickness of the vibration plate portion 4 μm or less and further an aspect that makes the total film thickness of the vibration plate portion 3 μm or less are possible. In addition, the gas phase film forming method is useful in that it can form a desired film thickness with high accuracy. In view of this, it is possible to considerably reduce errors of the device operation from the design.

(Seventh Aspect): In the angular velocity sensor according to any one of the first aspect to the sixth aspect, a configuration is possible in which the piezoelectric layer is a thin film formed by a sputtering method.

Fine processing is readily performed by forming the piezoelectric-body film by the sputtering method and subjecting the film to film-thinning.

In addition, it is possible to obtain a piezoelectric-body thin film having desired piezoelectric performance by using a gas phase growth method represented by the sputtering method and a direct film forming method such as a sol-gel method. It is possible to simplify the production process of the device by directly forming the thin film of the piezoelectric body and processing the film by a semiconductor process such as dry etching or wet etching.

(Eighth Aspect): In the angular velocity sensor according to any one of the first aspect to the seventh aspect, a configuration is possible in which the piezoelectric layer is one or more than two perovskite-type oxides expressed by the following expression (P):

general expression: $ABO_3$ (P)

wherein A is an A-site element that is at least one element including Pb;

B is a B-site element that is at least one element selected from the group consisting of Ti, Zr, V, Nb, Ta, Sb, Cr, Mo, W, Mn, Sc, Co, Cu, In, Sn, Ga, Zn, Cd, Fe, and Ni; O is an oxygen element;

a mol ratio of the A-site element, the B-site element, and the oxygen element is 1:1:3 as a standard, but the mol ratio thereof may be deviated from a reference mol ratio as long as a perovskite structure is obtained.

A piezoelectric body of this sort has a good piezoelectric characteristic, and preferable for an angular velocity sensor performing driving and detection.

(Ninth Aspect): In the angular velocity sensor according to any one of the first aspect to the seventh aspect, a configuration is possible in which the piezoelectric layer is one or more than two perovskite-type oxides expressed by the following expression (PX):

$$A_a(Zr_x, Ti_y, M_{b-x-y})_b O_c \quad (PX)$$

wherein A is an A-site element that is at least one element including Pb;

M is at least one element selected from the group consisting of V, Nb, Ta, and Sb, where $0<x<b$; $0<y<b$, and $0 \leq b-x-y$;

a mol ratio of a:b:c=1:1:3 is a standard but the mol ratio thereof may be deviated from a reference mol ratio as long as a perovskite structure is obtained.

The piezoelectric body of this sort has a good piezoelectric characteristic and preferable in an angular velocity sensor that performs driving and detection.

(Tenth Aspect): In the angular velocity sensor according to any one of the first aspect to the ninth aspect, a configuration is possible in which the vibration plate layer is obtained by being formed on a silicon substrate; and the weight section and the pedestal section are configured by remaining portions of the silicon substrate, the remaining portions being obtained as a result of removing part of the silicon substrate having the vibration plate layer formed thereupon.

According to the ninth aspect, it is made possible to manufacture an angular velocity sensor using a silicon substrate less expensive than an SOI substrate.

(Eleventh Aspect): In the angular velocity sensor according to any one of the first aspect to the tenth aspect, a configuration is possible in which the diaphragm part has an outer circumferential shape that is circular or elliptical in a plan view; and the weight section is arranged at a concentric position of the circle or ellipse sharing a central axis with the diaphragm part.

(Twelfth Aspect): A method for manufacturing an angular velocity sensor according to a twelfth aspect is a method for manufacturing an angular velocity sensor, the angular velocity sensor including a flexible diaphragm part including a laminated structure, the laminated structure of the diaphragm part being constituted by an upper electrode including a driving electrode part and a detection electrode part, the driving electrode part and the detection electrode part being pattern-arranged, a piezoelectric layer, a lower electrode, and one or more vibration plate layers; a pedestal section supporting an outer circumference of the diaphragm part; and a weight section joined to a central part of the diaphragm part, the angular velocity sensor causing the weight section to vibrate using an inverse piezoelectric effect of a piezoelectric body by applying an electric field to the piezoelectric layer via the driving electrode part, and detecting a displacement generated in the weight section on the basis of a Coriolis force, the displacement being detected by a piezoelectric effect from the detection electrode part;

the vibration plate layer being formed by a thin film forming technique; the method comprising: forming the one or more vibration plate layers using a thin film forming technique; and when a resonance frequency in a resonance vibration mode calculated from dimensions of a structural body of the angular velocity sensor and an elastic parameter of a material constituting the structural body is f (in units of kilohertz [kHz]), a mass of the weight section is M (in units of milligrams [mg]), a circumferential length of the diaphragm part is r (in units of meters [m]), a stress acting on the piezoelectric layer is $\sigma_P$ (in units of pascals [Pa]), a film thickness of the piezoelectric layer is $t_P$ (in units of meters [m]), a stress acting on an n-th layer of a vibration plate portion constituted by a plurality of layers including the lower electrode and the one or more vibration plate layers is $\sigma_n$ (in units of pascals [Pa]), the n-th layer being n-th from the side of the weight section, and a film thickness of the n-th layer being $t_n$ (in units of meters [m]) (where n is a natural number), then adjusting $\sigma_P$, $\sigma_n$, $t_n$, and $t_P$ such that $T_{eff}$ expressed by the expression:

[Math 5]

$$T_{eff} = \frac{r\left(\sigma_P t_P + \sum_n \sigma_n t_n\right)}{M}$$

satisfies:

[Math 6]

$$\frac{-0.36f^2 + 210}{33} \leq T_{eff} \leq \frac{0.44f^2 + 210}{33}.$$

According to the twelfth aspect, the shift of the resonance frequency from the design value f is maintained within an allowable range of ±20%. In addition, according to the twelfth aspect, manufacturing is possible with cost lower than that of a conventional angular velocity sensor. In addition, further film-thinning and device miniaturization are possible when compared with a conventional configuration.

In the twelfth aspect, the matters defining the second to eleventh aspects can be combined as appropriate.

According to the present invention, manufacturing is possible with cost lower than that of a conventional angular velocity sensor manufactured using an SOI substrate. In addition, according to the present invention, further miniaturization of the angular velocity sensor is possible, and deviation from the resonance frequency in design is maintained within an allowable range.

BRIEF DESCRIPTION OF THE DRAWINGS

FIG. 12 is a table summarizing conditions and results of exemplary experiments;

FIG. 13 is a table recording amounts of deviation of actual resonance frequencies with reference to design values of resonance frequencies in each of the exemplary experiments.

DETAILED DESCRIPTION OF EXEMPLARY EMBODIMENTS

The following describes embodiments of the present invention in detail with reference to the accompanying drawings.

<Exemplary Structure of the Angular Velocity Sensor>

Figure 1:
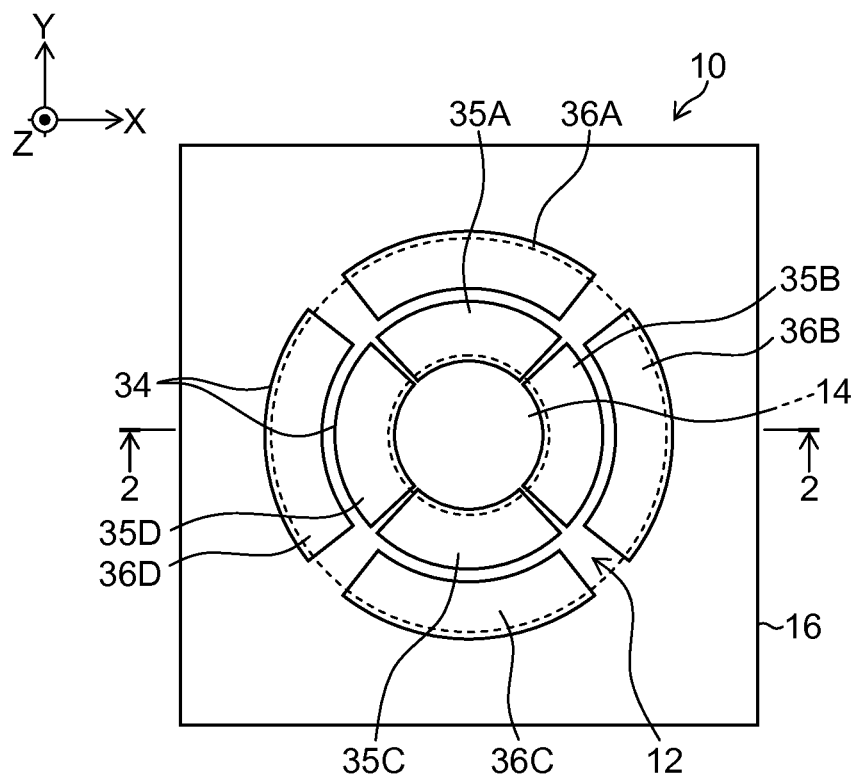
FIG. 1 is a plan view illustrating a configuration of an angular velocity sensor according to an embodiment of the present invention.
Figure 2:
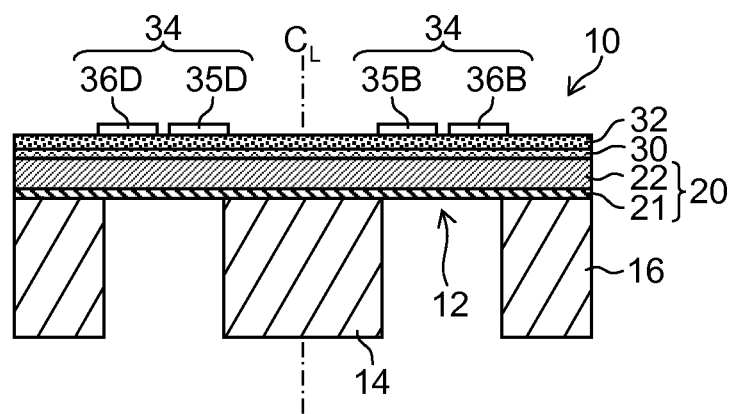
FIG. 2 is a cross-sectional view taken along a line 2-2 of FIG. 1.

FIG. 1 is a plan view illustrating a configuration of an angular velocity sensor according to one embodiment of the present invention, and FIG. 2 is a cross-sectional view taken along a line 2-2 of FIG. 1.

The angular velocity sensor 10 includes a diaphragm part 12 having an outer circumferential shape that is circular in a plan view, a weight section 14 supported at the central part of the diaphragm part 12, and a pedestal section 16 supporting the outer circumference of the diaphragm part 12. The diaphragm part 12 has a laminated structure (multilayer structure) formed by lamination including a vibration plate layer 20, a lower electrode 30, a piezoelectric layer 32, and an upper electrode 34 in this order from the side on which the weight section 14 is joined (a lower surface side in FIG. 2) in a direction away from the weight section 14 in a film thickness direction (an upward direction of FIG. 2). The diaphragm part 12 is flexible, and the whole circumference of the outer circumference thereof is fixed to the pedestal section 16.

The vibration plate layer 20 is configured by one or more thin films formed using a thin film forming technique. In this example, although the vibration plate layer 20 having a two-layer structure is illustrated, the vibration plate layer 20 being formed by laminating a second vibration plate layer 22 on the first vibration plate layer 21 (see FIG. 2), the structure of the vibration plate layer 20 is not limited to this example. The vibration plate layer 20 can be configured by a single layer, and may be configured by a laminated structure (multilayer thin film) of two or more layers.

In addition, not only the vibration plate layer 20 (21, 22) but also the other layers (30, 32, 34) constituting the diaphragm part 12 are formed using the thin film forming technique. The thin film forming technique includes a physical gas phase film forming method (PVD: physical vapor deposition), a chemical gas phase film forming method (CVD: chemical vapor deposition), a liquid phase film forming method (plating, application, sol-gel method, spin coat method, etc.), and a thermal oxidation method. An appropriate one of the film forming techniques is selected for each layer.

Note that the film thickness of each of the layers and the ratio of the film thicknesses illustrated in FIG. 2 and other drawings are illustrated with modifications made thereto as appropriate, and do not necessarily reflect the actual film thicknesses and the ratio thereof. In addition, in this specification, in the context of description of the laminated structure, the term "on" as in the phrase "laminating B on A" is described as "on" with reference to the direction away from A in a direction of the thickness of the film. When B is laminated on the upper surface of A in a state where A is horizontally held, the direction coincides with upward and downward directions wherein the gravity direction is regarded as the downward direction. However, a posture of A may be inclined or vertically inverted. In view of this, even with regard to a case where the laminating direction of the laminated structure that depends upon the posture of the substrate and film does not necessarily coincide with the vertical direction that is vertical with reference to the direction of gravity, the term "on" is expressed as "on" with reference to the direction away in the thickness direction from a surface of a member serving as the reference (for example, A) in order to describe the upward-and-downward relationship of the laminated structure without confusion. In addition, the expression "laminating B on A" is not limited to laminating B directly upon A such that B is in contact with A, but may refer to a case where B is laminated on A via another layer or a plurality of other layers such that the other layer or layers reside between A and B.

In the example of FIG. 2, film forming on a substrate (silicon substrate) constituting the pedestal section 16 and the weight section 14 is performed in order of the first vibration plate layer 21, the second vibration plate layer 22, the lower electrode 30, the piezoelectric layer 32, and the upper electrode 34.

The upper electrode 34 formed on the piezoelectric layer 32 is subjected to patterning so as to include driving electrode parts 35A to 35D functioning as electrodes for use in driving and detection electrode parts 36A to 36D functioning as electrodes for use in detection (see FIG. 1). In order that the driving electrode parts 35A to 35D and the detection electrode parts 36A to 36D are each allowed to function as an independent electrode, each of the electrode parts (35A to 35D and 36A to 36D) are pattern-arranged in a form in which they are discrete from each other.

In this embodiment, the electrode pattern is rotation symmetric about a symmetry axis coinciding with a central axis $C_L$ passing the center of the circle of the diaphragm part 12 having an outer circumferential shape that is circular in a plan view. The weight section 14 is arranged at a concentric position sharing the central axis $C_L$ with the diaphragm part 12.

The pattern arrangement of the driving electrode parts 35A to 35D and the detection electrode parts 36A to 36D illustrated in FIG. 1 is an illustration of four-fold symmetry pattern in which when they are rotated by 90 degrees about the central axis $C_L$, they overlaps with the corresponding other one of them, but the form of the pattern arrangement of the upper electrode 34 is not limited to the example of FIG. 1, and may be provided in various forms of arrangement. In addition, it is possible to replace the driving electrode parts 35A to 35D and the detection electrode parts 36A to 36D by each other.

A piezoelectric element part for use in driving is constituted by the region of the piezoelectric layer 32 residing between the driving electrode parts 35A to 35D and the lower electrode 30. When a driving voltage is applied between the electrodes of the piezoelectric element part for use in driving (by application of an electric field to the piezoelectric layer 32), the diaphragm part 12 and the weight section 14 can be made to vibrate by an inverse piezoelectric effect of the piezoelectric body. The piezoelectric element part for use in driving including the driving electrode parts 35A to 35D is connected to a not-shown power source (driving circuit) that supplies a driving electric power, and thereby functions as an energizing unit adapted to make the weight section 14 vibrate.

In addition, a piezoelectric element part for use in detection is constituted by a region of the piezoelectric layer 32 residing between the detection electrode part 36 and the lower electrode 30. When an angular velocity acts upon the vibrating weight section 14, then a Coriolis force acts and causes displacement in the vibration of the weight section 14. The displacement caused on the basis of the Coriolis force and generated in the weight section 14 is detected by the piezoelectric effect of the piezoelectric body, and an electric signal (detection signal) is obtained from the detection electrode part 36. The piezoelectric element part for use in detection including the detection electrode parts 36A to 36D is connected to a not-shown processing circuit (detection circuit) for processing the detection signal and thereby functions as a displacement detection unit for detecting the displacement of the weight section 14 through.

Note that, in the following, for convenience of explanation, an orthogonal XYZ-axes are introduced wherein the center of the circle of the diaphragm part 12 is defined as an origin, a right-left direction of FIG. 1 is defined as an X-axis direction, a longitudinal direction of FIG. 1 orthogonal thereto is defined as a Y-axis direction, and a vertical direction with respect to the paper surface of FIG. 1 is defined as a Z-axis direction. The central axis $C_L$ illustrated in FIG. 2 is an axis parallel to the Z-axis.

Figure 3:
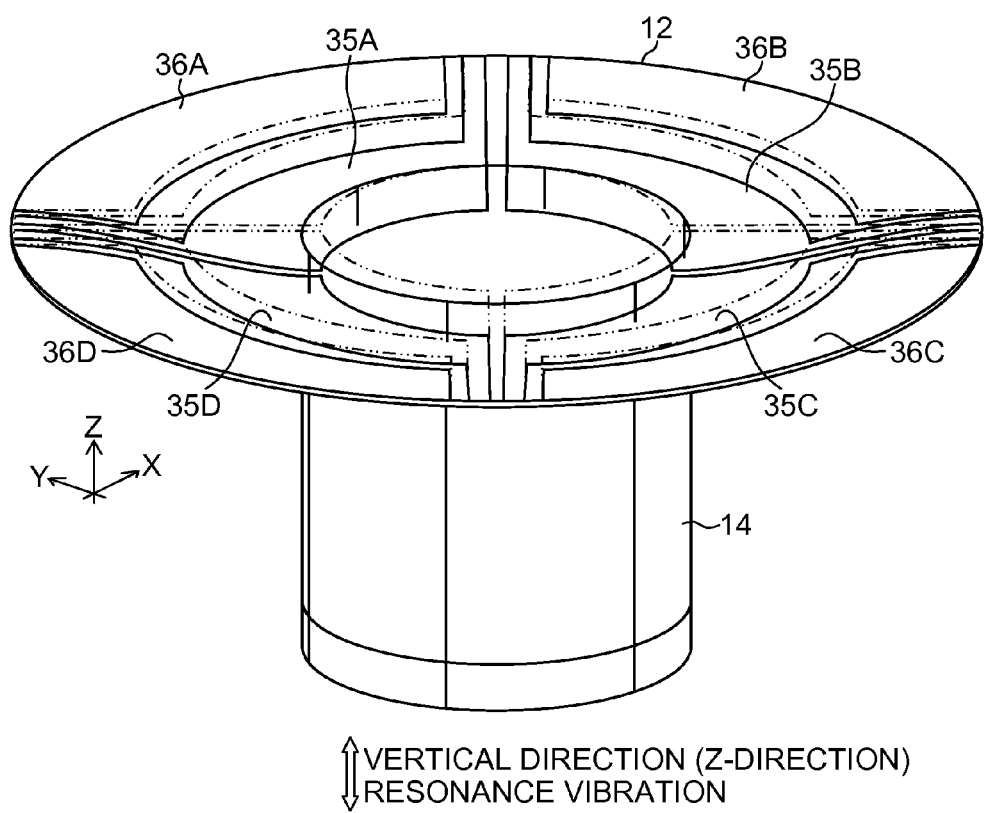
FIG. 3 is a schematic diagram illustrating a state at a time of resonance vibration driving in a Z-direction (vertical direction)
Figure 4:
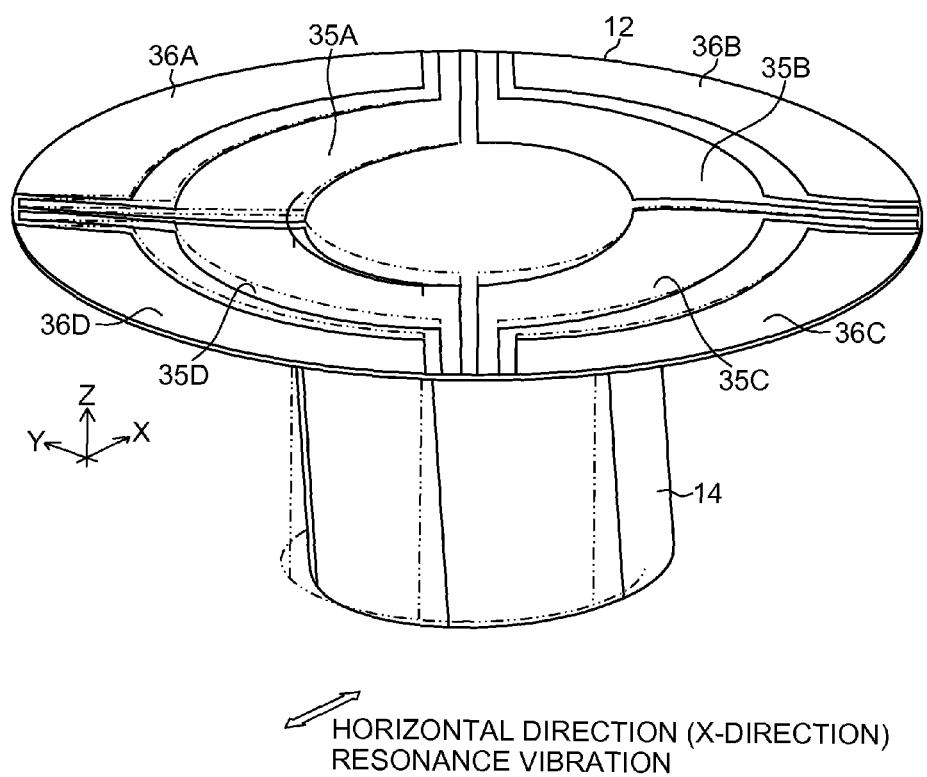
FIG. 4 is a schematic diagram illustrating a state at a time of resonance vibration driving in an X-direction (horizontal direction)

FIG. 3 is a schematic diagram illustrating a state at the time of resonance vibration driving in the Z-direction, and FIG. 4 is a schematic diagram illustrating a state at the time of resonance vibration driving in the X-direction. Note that, in FIGS. 3 and 4, illustration of the pedestal section 16 is omitted and only the diaphragm part 12 and the weight section 14 are illustrated.

When the weight section 14 is resonance-driven in the vertical direction (Z-direction) with respect to the surface of the diaphragm part 12 as illustrated in FIG. 3, the flexible diaphragm part 12 is displaced in the Z-direction, so that a detection signal can be obtained from the detection electrode parts 36A to 36D in response to the displacement.

In addition, when the weight section 14 is resonance-driven in the X-direction (horizontal direction) as illustrated in FIG. 4, a corresponding detection signal is obtained from each of the detection electrode parts 36A to 36D in response to the displacement of the diaphragm part 12 in accordance with the vibration direction. It is possible to keep the state of resonance vibration by making the self-excited vibration circuit operate on the basis of the detection signal of driving vibration. In addition, when the weight section 14 vibrates, by virtue of the effect of the Coriolis force, in a direction different from the resonance driving direction, a detection signal in accordance with the displacement can be obtained, so that it is possible to detect the angular velocity from the detection signal.

Note that, with regard to the detection principle of the angular velocity, the detection principle is as described in PTL 1 and PTL 2, and with regard to the method of driving the diaphragm part 12, the method described in PTL 1 and the method described in PTL 2 can be adopted.

<Example of the Manufacturing Method of the Angular Velocity Sensor>

FIG. 5A to FIG. 5E are explanatory drawings of the manufacturing method of the angular velocity sensor according to this embodiment.

(Step 1): First, a silicon (Si) substrate 110 is prepared (see FIG. 5A). As the Si substrate 110 for use, an SOI substrate is not used but a conventional silicon wafer is used, which is less expensive than the SOI substrate.

Figure 5A:
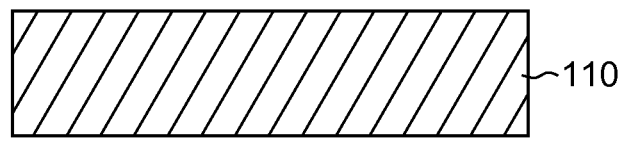
FIG. 5A is an explanatory drawing of a manufacturing method of an angular velocity sensor according to this embodiment.
Figure 5B:
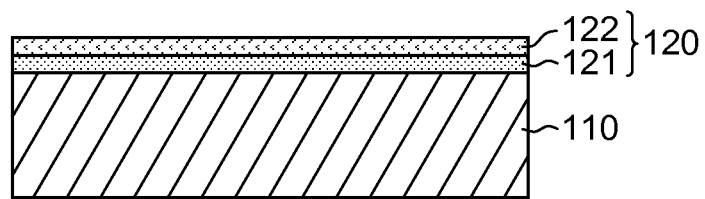
FIG. 5B is an explanatory drawing of the manufacturing method of the angular velocity sensor according to this embodiment.

(Step 2): Next, one or more vibration plate layers 120 are formed on one side surface of the Si substrate 110 by a thin film forming technique such as gas phase film forming (a "vibration plate layer film-forming step"). In FIG. 5B, there is illustrated a vibration plate layer having a two-layer structure by forming a first vibration plate layer 121 on the side proximate to the Si substrate 110 and then forming a second vibration plate layer 122 on the first vibration plate layer 121 in a stacked manner, but the vibration plate layer 120 may only include one single layer, or may be configured by a laminated structure of two layer or a more number of layers.

(Step 3): Next, a lower electrode 130 is formed on the vibration plate layer 120 (a "lower electrode forming step").

Figure 5C:
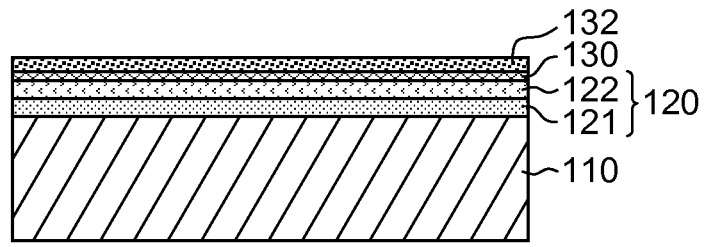
FIG. 5C is an explanatory drawing of the manufacturing method of the angular velocity sensor according to this embodiment.
Figure 5D:
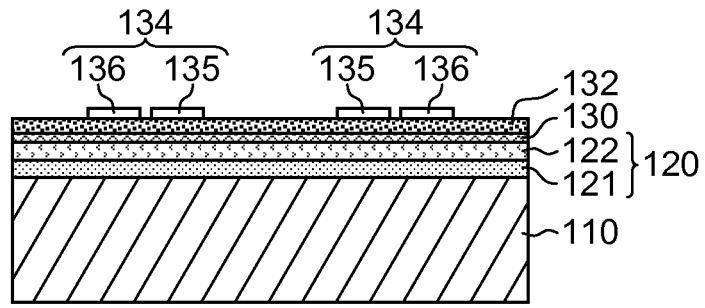
FIG. 5D is an explanatory drawing of the manufacturing method of the angular velocity sensor according to this embodiment.

(Step 4): Next, a piezoelectric layer 132 is formed on the lower electrode 130 (a "piezoelectric layer film-forming step"). In FIG. 5C where the state of lower electrode 130 and piezoelectric layer 132 having been formed is illustrated, the piezoelectric layer 132 is formed, for example, by a sputtering method.

(Step 5): Next, an upper electrode 134 is formed on the piezoelectric layer 132. As the upper electrode 134, patterning of a driving electrode part 135 and a detection electrode part 156 is performed (see FIG. 5D; an "upper electrode forming step").

Figure 5E:
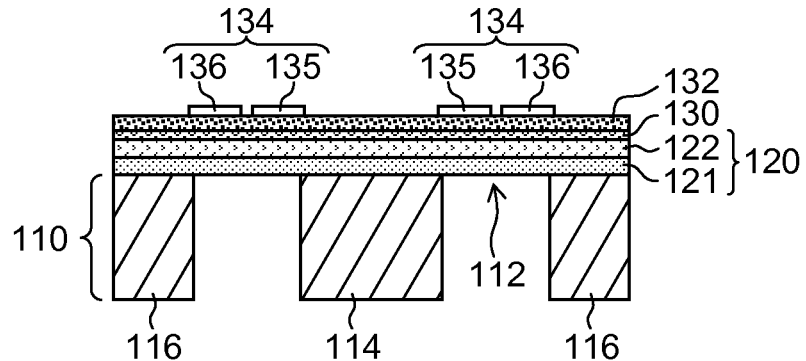
FIG. 5E is an explanatory drawing of the manufacturing method of the angular velocity sensor according to this embodiment.

(Step 6): Thereafter, a portion of the Si substrate 110 is subjected to a removal process by deep-etching the Si substrate 110 from the rear surface side thereof, and a weight section 114 and a pedestal section 116 are formed by the remaining portion (FIG. 5E; a "substrate working step"). By this substrate working step, the circumference of the weight section 114 is removed such that a groove with a circular ring shape is formed, and the removed portion constitutes a region functioning as the driving part and the detection part of the diaphragm part 112.

<Explanation of the Manufacturing Process of the Angular Velocity Sensor Using an SOI Substrate>

For comparison, a manufacturing process of an angular velocity sensor using an SOI substrate is described. FIGS. 6A to 6D are explanatory drawings of the manufacturing process of the angular velocity sensor using the SOI substrate.

Figure 6A:
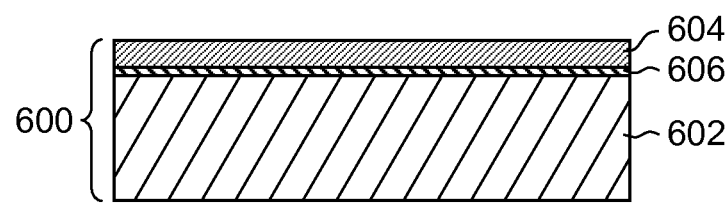
FIG. 6A is an explanatory drawing of a manufacturing process of an angular velocity sensor using an SOI substrate.

As illustrated in FIG. 6A, an SOI substrate 600 is a multilayer-structure substrate in which a $SiO_2$ layer 606 is inserted between a silicon substrate as a handle layer 602 and a surface silicon layer 604 (which is referred to as a "device layer"). The device layer 604 is a layer that is eventually made to function as a vibration plate of the diaphragm part, whose film thickness is adjusted by polishing.

Figure 6B:
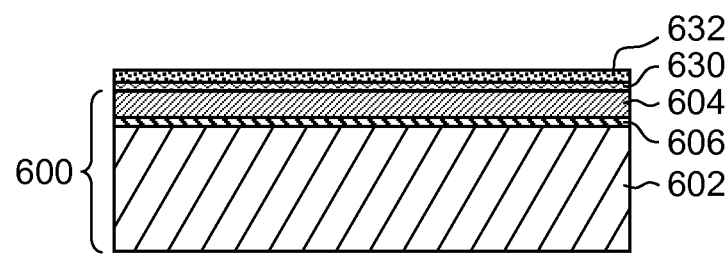
FIG. 6B is an explanatory drawing of the manufacturing process of the angular velocity sensor using the SOI substrate.

By using the SOI substrate 600 like this, a lower electrode 630 is formed on the device layer 604 of the SOI substrate 600 as illustrated in FIG. 6B, and a piezoelectric layer 632 is formed thereupon.

Figure 6C:
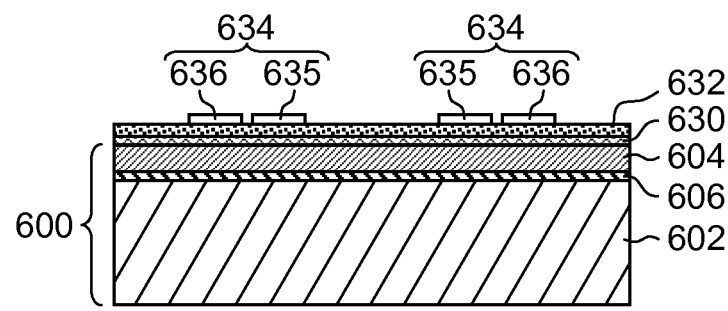
FIG. 6C is an explanatory drawing of the manufacturing process of the angular velocity sensor using the SOI substrate.

Subsequently, patterning, as an upper electrode 634, of a driving electrode part 635 and a detection electrode part 636 is performed on the piezoelectric layer 632 as illustrated in FIG. 6C.

Figure 6D:
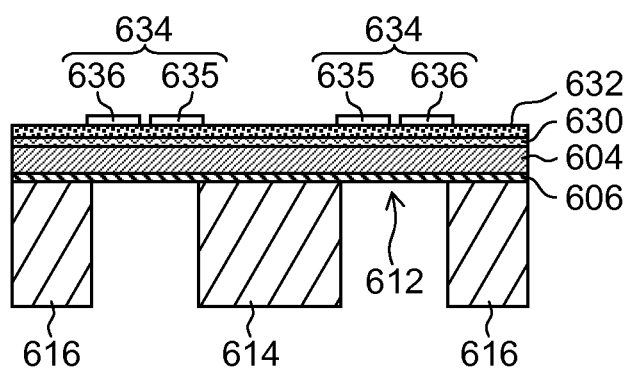
FIG. 6D is an explanatory drawing of the manufacturing process of the angular velocity sensor using the SOI substrate.

Following this, as illustrated in FIG. 6D, a portion of the handle layer 602 is removed by performing deep-etching of the handle layer 602, and a weight section 614 and a pedestal section 616 are formed by the remaining portion. The device layer 604 remaining on the portion that has been removed by the deep-etching (reference numeral 612) serves as a vibration plate.

Since the process as described with reference to FIGS. 6A to 6D adjusts the film thickness of the device layer 604 by polishing, it is difficult to realize further thinning and uniformizing due to constraints associated with the polishing, imposing limitation upon miniaturization of the device. In addition, the SOI substrate is expensive compared with a conventional Si substrate.

In this respect, in accordance with the manufacturing process described with reference to FIGS. 5A to 5E, a vibration plate layer is formed using an inexpensive Si substrate and by a thin film formed by a thin film forming technique, so that manufacturing at lower cost is possible, a thin-film vibration plate layer having less manufacture irregularity can be obtained, and further miniaturization of the device is possible.

Although it is possible to design the thickness of the diaphragm part as appropriate, the film thickness of the vibration plate layer can be configured to be 5 micrometers or less. In addition, the total film thickness of the vibration plate portion constituted by multiple layers including one or more vibration plate layer and a lower electrode can be configured to be 5 micrometers or less.

<With Regard to the Technical Problem Associated with Use of Thin Film Forming Techniques>

Since the driving of the weight section 14 and the detection of the angular velocity in the angular velocity sensor 10 of a vibration gyro type as illustrated in FIGS. 1 to 4 utilize resonance vibration, designing of resonance frequency is very important. In view of this, designing of the device is generally performed on the basis of calculation of a resonance frequency of a resonance vibration mode for use in either of gyro driving and detection, the calculation being performed using a simulation method such as a finite element method (FEM) from the dimensions of a structural body and an elastic parameter of a material constituting the structural body.

However, since a residual stress exists in the diaphragm part configured by a thin film that is formed by a thin film forming technique, this fact affects the resonance frequency of the device and there is a problem that the resonance frequency does not become exactly identical with the design value. Specifically, in an actually manufactured device, the resonance frequency does not become exactly identical with the design value due to the residual stress of the structural body. In particular, in a case where a multilayer thin film like the diaphragm part 12 is used as a vibration plate, the residual stresses each existing in the respective one of the layers constituting the vibration plate portion affect the resonance frequency, and there is a problem that the sensitivity conforming to the design cannot be obtained as a device.

<Ascertaining and Dealing with Causes Toward Problem Solution>

The relationship between the residual stress of the film and the deviation from the design resonance frequency is examined as follows.

In the vibration gyro structure illustrated in FIGS. 1 to 4, when it is assumed that a maximum kinetic energy of the weight section supported by the diaphragm part is K, a maximum elastic energy of the diaphragm part is U, and a maximum potential energy due to a tension of the diaphragm part is N, then in the resonance state, the following expression (1) holds:

[Math 7]

$$U+N=K \qquad \text{Expression (1).}$$

Here, suppose that a maximum displacement amount is x, a resonance frequency is f, a spring constant is k, a mass of the weight section is m, a velocity of the weight section is v, and a tension acting upon the diaphragm part is T, K and U are expressed by the expressions (2) and (3), respectively:

[Math 8]

$$K = \frac{1}{2}mv^2 = \frac{1}{2}m \times 4x^2\pi^2 f^2, \qquad \text{Expression (2)}$$

[Math 9]

$$U = \frac{1}{2}kx^2. \qquad \text{Expression (3)}$$

A reaction force F due to the tension resulting from the diaphragm part being displaced by an amount of x is, in a region where x and T are very small, expressed by the expression (4):

[Math 10]

$$F = \alpha Tx \qquad \text{Expression (4)},$$

where α is a proportional constant. At this point, the potential energy N due to the tension is given by the expression (5):

[Math 11]

$$N = \int_x F\,dx = \frac{1}{2}\alpha Tx^2. \qquad \text{Expression (5)}$$

By substituting the expression (2), expression (3), and expression (5) into expression (1) and summarizing the expression (1) results in the following expression (6):

[Math 12]

$$f^2 = \frac{1}{4\pi^2}\left(\frac{k}{m} + \frac{\alpha T}{m}\right). \qquad \text{Expression (6)}$$

The first term of the right side of the expression (6) is a resonance frequency when a tension does not act, which is a design value calculated using a finite element method (FEM) or the like. When the tension acts upon the diaphragm part as a result of the residual stress or the like of the film constituting the vibration plate layer, then the resonance frequency is shifted from the design value due to the effect of the second term of the right side of the expression (6).

T/m in the expression (6) corresponds to $T_{\mathit{eff}}$ which will be later described.

In the present invention, an indicator $T_{\mathit{eff}}$ which is defined by the following expression (7) is introduced:

[Math 13]

$$T_{\mathit{eff}} = \frac{r\left(\sigma_p t_p + \sum_n \sigma_n t_n\right)}{M}. \qquad \text{Expression (7)}$$

In the expression (7), it is supposed that the mass of the weight section is M (in units of milligrams [mg]), a circumferential length of the diaphragm part is r (in units of meters [m]), a stress acting upon the piezoelectric layer is $\sigma_p$ (in units of pascals [Pa]), a film thickness of the piezoelectric layer is $t_p$ (in units of meters [m]), a stress acting upon an n-th layer counted from the side of the weight section in the vibration plate portion constituted by the lower electrode and one or more vibration plate layer is $\sigma_n$ (in units of pascals [Pa]), and the film thickness of this n-th layer is $t_n$ (in units of meters [m]) (where n is a natural number).

Note that, the vibration plate portion in the definition of $T_{\mathit{eff}}$ expressed by the expression (7) includes the lower electrode (common electrode).

Figure 7:
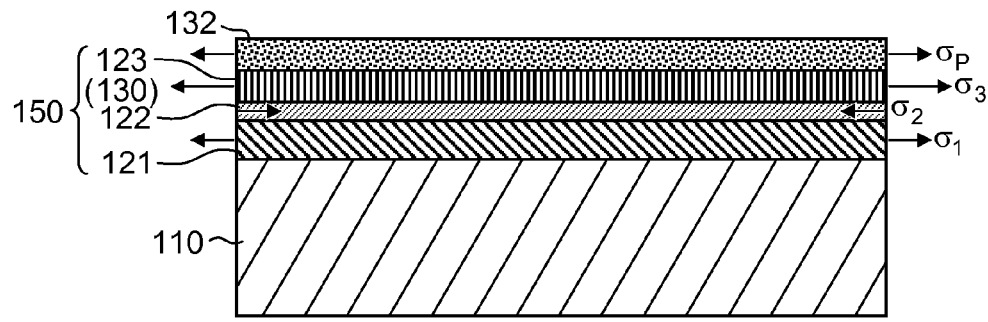
FIG. 7 is a schematic diagram illustrating examples of each parameter of a laminated structure.

For reference, FIG. 7 illustrates a schematic diagram illustrating an example of each of the parameters indicated in the expression (7). In the structural body illustrated in FIG. 7, an example is illustrated in which the vibration plate layer is constituted by a three-layer structure (n=1, 2, 3) of the first vibration plate layer 121, the second vibration plate layer 122, and a third vibration plate layer 123. The third vibration plate layer 123 in FIG. 7 corresponds to the lower electrode 130 described with reference to FIG. 2.

In the case of the structural body of FIG. 7, a vibration plate portion 150 is constituted by the first vibration plate layer 121, the second vibration plate layer 122, and the third vibration plate layer 123. In other words, the laminated body of the vibration plate layers (121, 122) and the lower electrode 130 is treated as the "vibration plate portion." In FIG. 7, illustration is made, supposing that $\sigma_1$ is a residual stress in a tensile direction in the first vibration plate layer 121, $\sigma_2$ is a residual stress in the compression direction in the second vibration plate layer 122, $\sigma_3$ is a residual stress in the tensile direction in the third vibration plate layer 123, and $\sigma_P$ is a residual stress in the tensile direction in the piezoelectric layer 132, wherein the arrows in the figure indicate a direction and a magnitude of the stress acting upon each layer.

Next, the method of calculation of $T_{\mathit{eff}}$ in actual practice is described below.

In many cases the stresses $\sigma_n$, $\sigma_P$ of each layer defined by the expression (7) are not known, but the following relationships of the expressions (8) and (9) are found respectively, with regard to an average stress $\sigma_{ave}$ in a composite film (laminated structure) of the vibration plate layer and the piezoelectric layer, and a total film thickness $t_{total}$ of the composite film.

[Math 14]

$$\sigma_p t_p + \sum_n \sigma_n t_n = \sigma_{ave} t_{total} \qquad \text{Expression (8)}$$

[Math 15]

$$t_{total} = t_p + \sum_n t_n \qquad \text{Expression (9)}$$

Accordingly, $T_{\mathit{eff}}$ can be readily obtained by calculating $\sigma_{ave}$ using the expressions (10) and (11) described below.

[Math 16]

$$\sigma_{ave} = \frac{E_s t_s^2}{6(1-v)t_{total}R'} \qquad \text{Expression (10)}$$

[Math 17]

$$R' = \frac{1}{\left(\frac{1}{R_2} - \frac{1}{R_1}\right)} \qquad \text{Expression (11)}$$

Here, the definitions of the parameters of $R_1$, $R_2$, $E_S$, and $t_S$ are given by FIGS. 8A to 8C and FIGS. 9A to 9D.

Figure 8A:
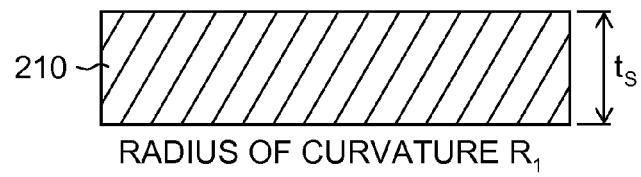
FIG. 8A is an explanatory drawing of parameter definition of a first case.
Figure 8B:
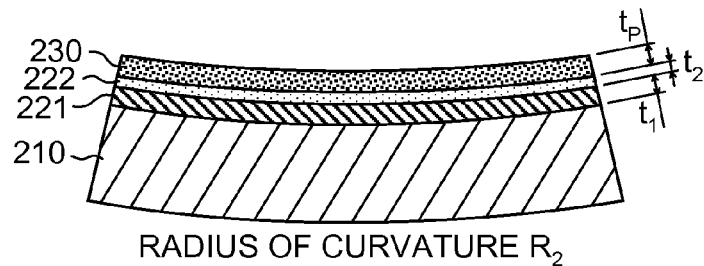
FIG. 8B is an explanatory drawing of parameter definition of the first case.
Figure 8C:
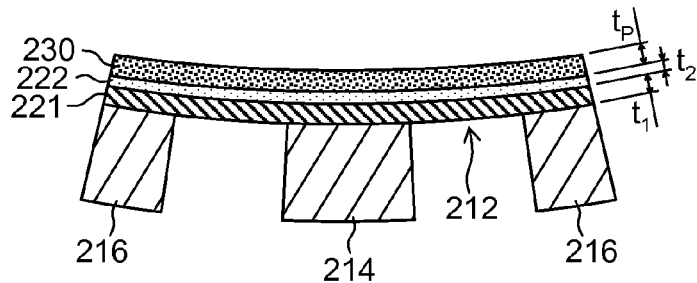
FIG. 8C is an explanatory drawing of parameter definition of the first case.

FIGS. 8A to 8C and FIGS. 9A to 9D are explanatory drawings of definitions of each of the parameters. FIGS. 8A to 8C are the explanatory drawings of the definitions of $R_1$ and $R_2$ according to a first case, and FIGS. 9A to 9D are the explanatory drawings of the definitions of $R_1$ and $R_2$ according to a second case. Here, for simplifying the explanation, a case is illustrated in which the vibration plate portion is configured by a two-layer structure, but the same explanation applies to cases in which the vibration plate portion is configured by a layer structure of further multiple layers.

<First Case>

The first case illustrated in FIGS. 8A to 8C is a case in which, for example, a single-crystal silicon wafer is used as a substrate 210. As illustrated in FIG. 8A, a plate thickness of the substrate 210 is given as $t_S$. As illustrated in FIG. 8B, a first vibration plate layer 221, a second vibration plate layer 222, and a piezoelectric layer 230 are formed in this order on this substrate 210.

A film thickness of the first vibration plate layer 221 is $t_1$, a film thickness of the second vibration plate layer 222 is $t_2$, and a film thickness of the piezoelectric layer 230 is $t_P$. The second vibration plate layer 222 is a layer that corresponds to the lower electrode. Although not illustrated in FIG. 8B, a pattern-arranged upper electrode is formed on the piezoelectric layer 230.

Subsequently, as illustrated in FIG. 8C, a portion of the substrate 210 is removed by deep etching from a rear surface side of the substrate 210, and a weight section 214 and a pedestal section 216 are formed by the remaining portion thereof. By this removal process, the part where the silicon layer is removed serves as a driving part and a detection part of a diaphragm part 212.

In the manufacturing process of this sort, a radius of curvature of the substrate 210 in an initial state (FIG. 8A) prior to film-forming of the first vibration plate layer 221 is given as $R_1$, and a radius of curvature of a laminated structural body in a state (FIG. 8B) prior to deep etching following the film-forming of each of the layers (221, 222, 230) of the piezoelectric layer 230 is given as $R_2$.

In the case of a single-crystal silicon wafer, since a residual stress does not exist in the initial state (FIG. 8A), the radius of curvature $R_1$ is infinite, and accordingly $1/R_1=0$ holds, and $R'=R_2$ of the expression (11) results.

$E_S$ in the expression (10) is a Young's modulus of the substrate 210. $\nu$ is a Poisson's ratio.

<Second Case>

Figure 9A:
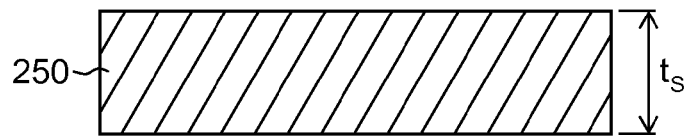
FIG. 9A is an explanatory drawing of parameter definition of a second case.
Figure 9B:
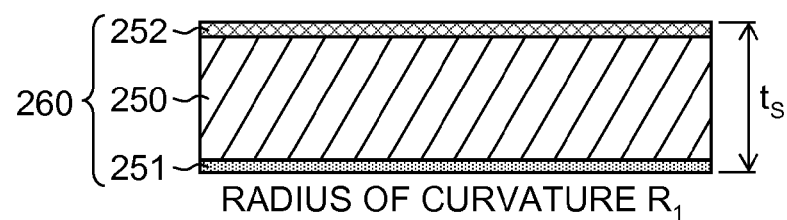
FIG. 9B is an explanatory drawing of parameter definition of the second case.

The second case illustrated in FIGS. 9A to 9D is a case where a film layer that is not eventually configured as the vibration plate is included. As illustrated in FIG. 9A, a base material 250 which serves as a base is used, and for this base material 250, as illustrated in FIG. 9B, film layers 251 and 252 that do not eventually become a vibration plate are added to one side surface or both side surfaces of the base material 250 (FIG. 9B). In FIG. 9B, an example is illustrated in which the film layers 251 and 252 are provided on the lower surface and the upper surface of the base material 250, respectively, but a form is possible according to which the film layer is only provided on either one of the surfaces (one side surface).

When the film layers 251, 252 that are not eventually configured as the vibration plate are included, a radius of curvature measured in the state of a laminated body 260 of the film layers 251, 252 and the base material 250 is given as $R_1$. Also, a sum of a thickness $t_{S0}$ of the base material 250, a film thickness $t_{S1}$ of the film layer 251, and a film thickness $t_{S2}$ of the film layer 252 are given as $t_S$ ($t_S=t_{S0}+t_{S1}+t_{S2}$). Accordingly, the laminated body 260 of FIG. 9B is identified as a member corresponding to the substrate 210 of FIG. 8A. $E_S$ in this case represents a Young's modulus of the laminated body 260 as a whole.

Figure 9C:
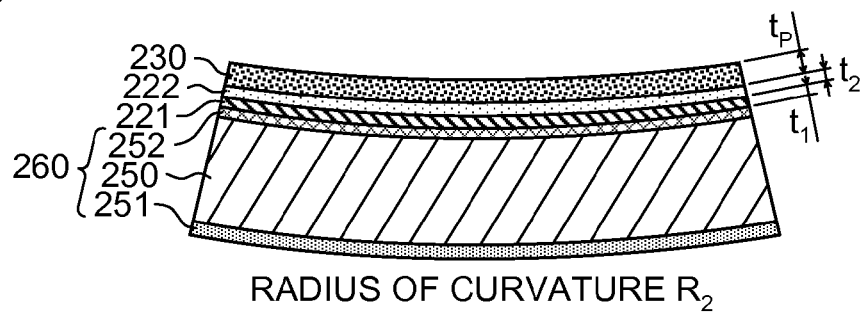
FIG. 9C is an explanatory drawing of parameter definition of the second case.

As illustrated in FIG. 9C, the first vibration plate layer 221, the second vibration plate layer 222, and the piezoelectric layer 230 are formed in this order on the film layer 252 of the laminated body 260. Although not illustrated in FIG. 9C, the pattern-arranged upper electrode is formed on the piezoelectric layer 230.

Figure 9D:
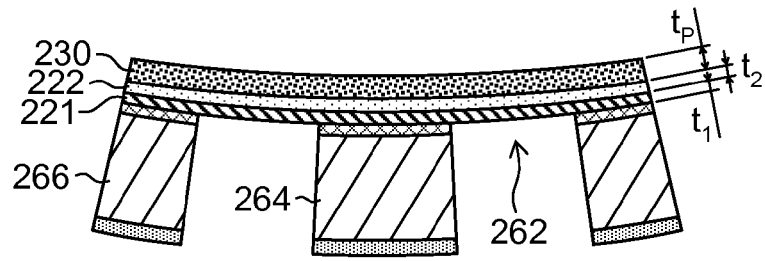
FIG. 9D is an explanatory drawing of parameter definition of the second case.

Subsequently, as illustrated in FIG. 9D, a portion of the laminated body 260 is removed by deep etching from a rear surface side (the side of the film layer 251) of the laminated body 260, and a weight section 264 and a pedestal section 266 are formed by the remaining portion thereof. By this removal, the part where the film layers 251, 252 and the base material 250 are removed serves as a driving part and a detection part of a diaphragm part 262. As illustrated in FIG. 9D, the film layers 251 and 252 do not eventually become the vibration plate of the diaphragm part 262.

In the manufacturing process of this sort, a radius of curvature of the base body (laminated body 260) in an initial state (FIG. 9B) prior to film-forming of the first vibration plate layer 221 is given as $R_1$, and a radius of curvature of the laminated structural body in the state (FIG. 9C) prior to deep etching following film-forming of each of the layers (221, 222, 230) of the piezoelectric layer 230 is given as $R_2$.

As has been described with reference to FIGS. 8A to 8C and FIGS. 9A to 9D, the term "substrate" in the context of the definition of the radius of curvature $R_1$ refers to the base body (laminated structural body) in a state where when a film layer or layers that do not eventually become the vibration plate are included, the film layers are all added thereto. In addition, the radiuses of curvature $R_1$ and $R_2$ are defined such that they take a positive (+) value when the surface on the side where the vibration plate layer is formed is in a concave state, and negative (−) value when the surface is in a convex state.

An average stress $\sigma_{ave}$ of the composite film can be calculated using the parameters described with reference to FIGS. 8A to 8C and FIGS. 9A to 9D.

<With Regard to the Solution to the Problem>

In this embodiment, in an angular velocity sensor having a structure in which a weight section is supported by a flexible diaphragm part, the structure is made such that there is provided more than one vibration plate layer formed on a silicon substrate by a thin film forming technique such as gas phase film forming. In addition, from the results of the experiments which will be described later, it has been found that the component of the second term of the right side of the expression (6) is generally in a proportional relationship with $T_{eff}$. Further, by setting the stress and film thickness of each layer such that $T_{eff}$ falls within a range where $T_{eff}$ satisfies a predetermined condition (the expression of [Math 2]), it was found that an amount of shift of the resonance frequency from a design value can be maintained within an allowable range (±20%).

Exemplary Embodiment

Figure 10:
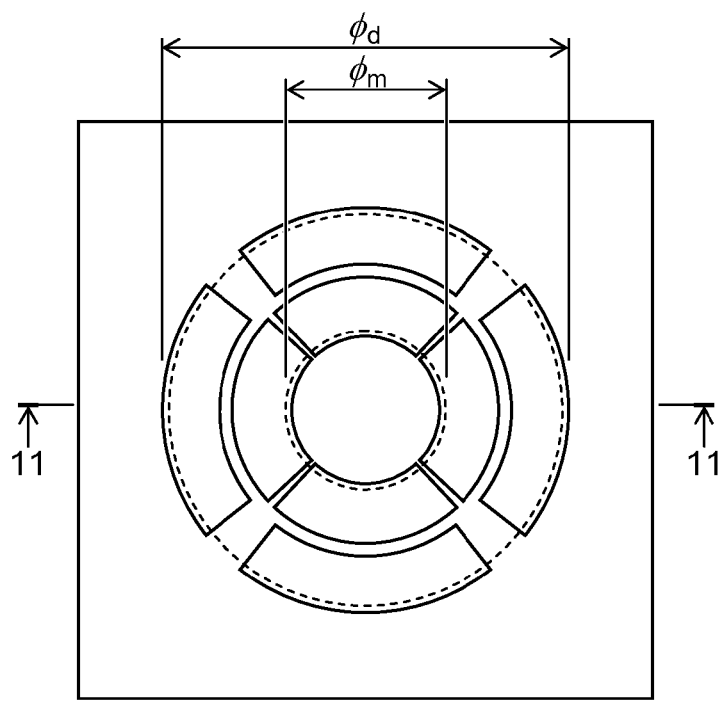
FIG. 10 is a plan view illustrating a structure of a prototype angular velocity sensor in accordance with exemplary experiments.
Figure 11:
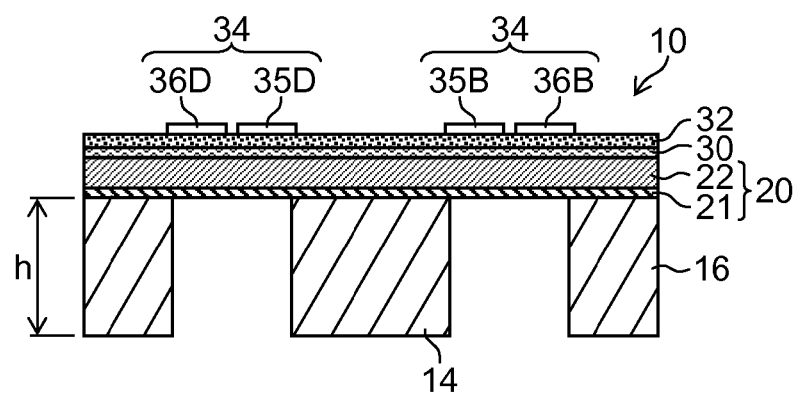
FIG. 11 is a cross-sectional view taken along a line 11-11 of FIG. 10.

FIG. 10 is a plan view illustrating the structure of a prototype angular velocity sensor in accordance with exemplary experiments, and FIG. 11 is a cross-sectional view taken along a line 11-11 of FIG. 10. FIGS. 10 and 11 are each the same structure described with reference to FIGS. 1 and 2, respectively, and with regard to the definition of the dimensions of the device of the later-described each exemplary experiment, as illustrated in FIGS. 10 and 11, the outer diameter (major axis in the case of an ellipse) of the diaphragm part 12 is given as $\sigma_d$, the outer diameter (major axis in the case of an ellipse) of the weight section 14 is given as $\sigma_m$, and the thickness of the weight section 14 is given as h. Note that, in the case of a diaphragm section that is circular in a plan view, the circumferential length r is expressed as $\pi \times \sigma_d$.

Vibration plate layers 1, 2, and 3 were formed on a Si substrate having a thickness h (in units of micrometers [μm])

with various gas phase film forming methods. The "vibration plate layer 1" corresponds to the first vibration plate layer (the reference numeral 21 of FIG. 2 and the reference numeral 121 of FIG. 5E), the "vibration plate layer 2" corresponds to the second vibration plate layer (the reference numeral 22 of FIG. 2 and the reference numeral 122 of FIG. 5E), the "vibration plate layer 3" corresponds to the lower electrode (the reference numeral 30 of FIG. 2 and the reference numeral 130 of FIG. 5E, the third vibration plate layer) (see FIGS. 2 and 5E).

Subsequently, a piezoelectric-body (lead zirconate titanate, PZT) film was formed using a high frequency (Rf; radio frequency) sputter device. As the film-forming gas, 97.5% Ar and 2.5% $O_2$ were used, and as the target material, that having the composition of $Pb_{1.3}((Zr_{0.52}Ti_{0.48})_{0.88}Nb_{0.12})O_3$ was used. A film-forming pressure was 2.2 mTorr (approximately 0.293 Pa), a film-forming temperature was 450° C. The obtained PZT film was a Nb-doped PZT thin film in which Nb was added by an atomic composition ratio of 12%.

After having thus formed the piezoelectric layer, an upper electrode in accordance with a layer structure of Au/Ti was pattern-formed by a lift-off method, and eventually a handle layer (silicon substrate layer) was formed by deep etching (Deep RIE) from a back surface of the Si substrate, and thus an angular velocity sensor of the configuration like that of FIGS. 10 and 11 was created.

Note that, in describing the laminated structure of the film, a configuration in which an A-material layer, a B-material layer, and a C-material layer are laminated in this order from the upper layer to the lower layer is indicated by the notation of "A/B/C." In other words, the notation indicates that the material described before the slash "/" constitutes the upper layer, and the material described after the slash "/" constitutes the lower layer.

At a stage after PZT film-forming, a radius of curvature ($R_2$) of the substrate as a whole was measured, and from this value, an average stress $\sigma_{ave}$ of the composition film combining the vibration plate layer (vibration plate portion) and the piezoelectric layer was calculated.

Various experiments were carried out by changing conditions such as device dimensions, materials, and film thickness, and the vibration plate materials and film thicknesses thereof for each exemplary experiment are summarized in the table of FIG. 12. The film-forming methods of the various vibration plate layers adopted in the exemplary experiments are as follows:

DLC (Diamond Like Carbon): Ion plating Method
Thermal oxidation $SiO_2$: Thermal oxidation method
TEOS-$SiO_2$: TEOS (Tetra Ethyl Ortho Silicate)-CVD method
Ti: Sputtering method
TiW: Sputtering method
Poly-Si: LP (Low Pressure)-CVD method
Ir: Sputtering method.

In addition, with regard to each of these exemplary experiments, a resonance frequency (design value) of the resonance vibration mode for use in either one of driving of gyro and detection was calculated using a finite element method from the dimensions of the device structural body and the elastic parameters of the materials constituting the structural body, and the design values and amounts of deviation of the values of resonance frequencies obtained in the actual driving experiments are recorded in the table of FIG. 13. Note that, the "design value" in this context corresponds to the first term of the right side of the expression (6).

In FIG. 13, a design value of a resonance frequency in Z-direction resonance driving is given as "fz," a design value of a resonance frequency in X-direction resonance driving is given as "fx," and the Z-direction resonance frequency and the X-direction resonance frequency that were obtained from the results of the experiments are given as "fz'" and "fx'," respectively. An amount of deviation of the resonance frequency from the design value was evaluated by a difference of squares as in FIG. 13. Specifically, the difference of squares of the Z-direction resonance frequency $\Delta fz^2 = fz'^2 - fz^2$ and the difference of squares of the X-direction resonance frequency $\Delta fx^2 = fx'^2 - fx^2$ were examined.

Figure 14:
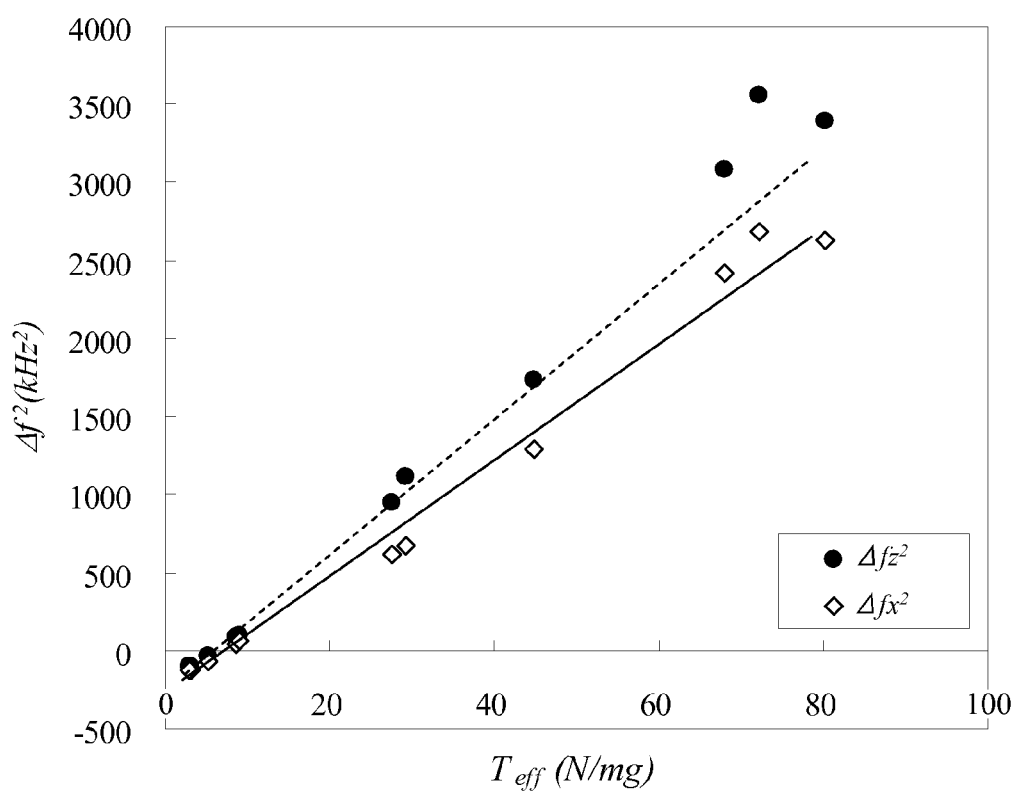
FIG. 14 is a graph plotting, from results of the exemplary experiments 1 to 11, the relationship between $T_{eff}$ and a difference of square ($\Delta f^2$) of the resonance frequency.

FIG. 14 is a figure in which relationships between $T_{eff}$ and the difference of squares of the resonance frequency ($\Delta f^2$) are plotted from the results of the exemplary experiments 1 to 11. In FIG. 14, the plot points indicated by a black dot represent $\Delta fz^2$, and the plot points indicated by a white outline rhombus represent $\Delta fx^2$.

It can be understood from the results illustrated in FIG. 14 that $\Delta f^2$ has a proportional relationship with $T_{eff}$ and that the difference of squares $\Delta fz^2$ of the resonance frequency of a vibration mode (referred to as Z-resonance) in which the weight section makes translational vibration in the vertical direction (Z-direction, i.e., in the "film thickness direction") is more susceptible to the effect of $T_{eff}$. In other words, when the resonance frequency shift in the Z-resonance is maintained within an allowable range, the deviation of the device's performance from its designed performance is maintained within the allowable range.

Here, since non-linearity of material appears in a device in which a stress of the vibration plate is very high, the resonance shift amount becomes deviated from the expression (6) (the shift amount increases gradually). In view of this, approximation was performed for the relationship between $\Delta fz^2$ and $T_{eff}$ by the least-squares method in the exemplary experiment 3, the exemplary experiment 4, the exemplary experiment 8, the exemplary experiment 9, and the exemplary experiment 10 in which the stress is small, and the following relationship of the expression (12) was found:

[Math 18]

$$\Delta f_z^2 = 33 T_{eff} - 210 \qquad \text{Expression (12)}.$$

In order to maintain the shift of the resonance frequency fz' of the actual device within 20% of the design resonance frequency fz, the following expression (13) should be satisfied.

[Math 19]

$$0.8 f_z \leq f'_z \leq 1.2 f_z,$$

that is, $$0.64 f_z^2 \leq f'^2_z \leq 1.44 f_z^2 \qquad \text{Expression (13)}.$$

In addition, since a relationship of the expression (14):

[Math 20]

$$f'^2_z = f_z^2 + \Delta f^2 \qquad \text{Expression (14)}$$

exists, combining and summarizing the expression (12), the expression (13), and the expression (14) results in an appropriate range of $T_{eff}$ given by the expression (15):

[Math 21]

$$\frac{-0.36f^2 + 210}{33} \le T_{\mathit{eff}} \le \frac{0.44f^2 + 210}{33}. \qquad \text{Expression (15)}$$

The shift of the resonance frequency from the design value can be suppressed within the allowable range (here, the resonance frequency shift within 20%) by performing film-forming of each layer by adjusting $\sigma_P$, $\sigma_n$, $t_n$, and $t_P$ such that the expression (15) is satisfied.

In the case of an angular velocity sensor (gyrosensor), a resonance frequency shift within 20% of the design value is generally allowable. Preferably, it is preferable that the resonance frequency shift is suppressed within 15% of the design value. More preferably, it is preferable that the resonance frequency shift is suppressed within 10% of the design value.

Likewise, the range of $T_{\mathit{eff}}$ for maintaining the shift of the resonance frequency fz' of the actual device within 15% of the design resonance frequency fz is given by the expression (16):

[Math 22]

$$\frac{-0.28f^2 + 210}{33} \le T_{\mathit{eff}} \le \frac{0.32f^2 + 210}{33}. \qquad \text{Expression (16)}$$

The shift of the resonance frequency from the design value can be suppressed within the allowable range (here, the resonance frequency shift within 15%) by performing film-forming of each layer by adjusting $\sigma_P$, $\sigma_n$, $t_n$, and $t_P$ such that the expression (16) is satisfied.

Likewise, the range of $T_{\mathit{eff}}$ for maintaining the shift of the resonance frequency fz' of the actual device within 10% of the design resonance frequency fz is given by the expression (17):

[Math 23]

$$\frac{-0.19f^2 + 210}{33} \le T_{\mathit{eff}} \le \frac{0.21f^2 + 210}{33}. \qquad \text{Expression (17)}$$

The shift of the resonance frequency from the design value can be suppressed within the allowable range (here, the resonance frequency shift within 10%) by performing film-forming of each layer by adjusting, $\sigma_P$, $\sigma_n$, $t_n$, and $t_P$ such that the expression (17) is satisfied.

Note that, in a case where an SOI substrate is used, it has been difficult to realize miniaturization with the diaphragm diameter $\sigma_d$ being 1000 micrometers (μm) or less, but by virtue of application of the present invention, as illustrated in the exemplary experiments 8 to 10, the diaphragm diameter $\sigma_d$ can be made as small as 800 μm (exemplary experiment 8) and 700 μm (exemplary experiments 9, 10).

The exemplary experiments 8 to 10 are particularly preferable embodiments in terms of miniaturization of the device and suppression of the amount of shift of the resonance frequency from the design value.

Example of Application

For example, in a case where an SOI wafer is used as a substrate, a device layer (Si-active layer) that becomes the principal part of a vibration plate is in principle in a state of no stress, but when residual stress of the piezoelectric-body film formed thereon is large, the value of resonance frequency is shifted relative to the design value, and it may occur that the specification value as a device is not satisfied.

In a case where the piezoelectric-body thin film is a PZT film, the film generally has a residual stress in a tensile direction. In this case, when a stress control layer is inserted as a layer constituting a vibration plate such that $T_{\mathit{eff}}$ calculated from the expression (7) is maintained within the range identified by the expression (15), the expression (16), or the expression (17), it is possible to suppress the amount of shift of resonance frequency within the allowable range.

As one example, it is contemplated that thermally oxidized $SiO_2$ having a compression stress is formed as a stress control layer with a predetermined film thickness on the surface of the device layer (Si-active layer) so as to maintain $T_{\mathit{eff}}$ within the range.

It is possible to control the stress of the composite film by forming the laminated structure combining as appropriate a film having a compression stress and a film having a tensile stress.

<With Regard to the Piezoelectric Material>

As a piezoelectric body suitable for this embodiment, the one that includes one or more than two perovskite-type oxides (P) expressed by the following expression may be mentioned.

General expression $ABO_3$ (P)

(where A is an A-site element that is at least one element including Pb;

B is a B-site element that is at least one element selected from a group of Ti, Zr, V, Nb, Ta, Sb, Cr, Mo, W, Mn, Sc, Co, Cu, In, Sn, Ga, Zn, Cd, Fe, and Ni;

O is an oxygen element; and a standard mol ratio of the A-site element, the B-site element, and the oxygen element is 1:1:3, and a mol ratio thereof may be deviated from a reference mol ratio within a range in which perovskite structure is obtained.)

As the perovskite-type oxides expressed by the above general expression, lead-containing compounds such as lead titanate, lead zirconate titanate (PZT), lead zirconate, lead lanthanum titanate, lead lanthanum zirconate titanate, magnesium niobate-lead zirconium titanate, magnesium niobate-lead zirconium titanate, nickel niobate-lead zirconium titanate, zinc niobate-lead zirconium titanate, and any mixed crystal system thereof; and lead-free compounds such as barium titanate, strontium barium titanate, bismuth sodium titanate, bismuth potassium titanate, sodium niobate, potassium niobate, lithium niobate, bismuth ferrite, and any mixed crystal system thereof, are mentioned.

In addition, it is preferable that the piezoelectric-body film of this embodiment includes one or more than two perovskite-type oxides (PX) expressed by the following expression:

General expression $A_a(Zr_x, Ti_y, M_{b-x-y})_b O_c$ (PX).

(where A is an A-site element that is at least one element including Pb; and

M is at least one element selected from a group of V, Nb, Ta, and Sb, wherein $0<x<b$, $0<y<b$, and $0 \le b-x-y$; and a:b:c=1:1:3 is the standard, but a mol ratio thereof may be deviated from a reference mol ratio within a range in which perovskite structure is obtained.)

The perovskite-type oxide (PX) is an intrinsic PZT, or a PZT whose B-site is partly substituted by M. It is known that a characteristic such as piezoelectric performance are increased, when compared with an intrinsic PZT, in PZTs to which various donor ions having a larger valence number than the valence number of a substitutable ion are added. It is preferable that M is one or more than two donor ions whose valence number is larger than that of tetravalent Zr and Ti. As donor ions of this kind, $V^{5+}$, $Nb^{5+}$, $Ta^{5+}$, $Sb^{5+}$, $Mo^{6+}$, and $W^{6+}$ are mentioned.

There is not a particular limitation regarding b–x–y as long as it falls within the range in which the perovskite structure is obtained. For example, when M is Nb, then it is preferable that the mol ratio of Nb/(Zr+Ti+Nb) is 0.05 or more and 0.25 or less, and more preferably 0.06 or more and 0.20 or less.

Since a piezoelectric-body film constituted by a perovskite-type oxide expressed by the above-described general expressions (P) and (PX) has a high piezoelectric distortion constant (d31 constant), a piezoelectric element including a piezoelectric-body film like this has a superior displacement characteristic and a detection characteristic.

In addition, a piezoelectric element including a piezoelectric-body film constituted by the perovskite-type oxide expressed by the general expressions (P) and (PX) has voltage-displacement characteristics with superior linearity. These piezoelectric materials are the ones that exhibit actuator characteristics and sensor characteristics effective in working of the present invention. Note that, the perovskite-type oxide expressed by general expression (PX) has a piezoelectric constant higher than that of the one expressed by general expression (P).

As one specific example of the piezoelectric layer 32 in this embodiment, for example, a lead zirconate titanate (PZT) thin film which is doped by Nb at an atomic composition percentage of 12% can be used. By film-forming of a PZT doped with 12% Nb by a sputtering method or the like, it is possible to stably produce thin films having a high piezoelectric characteristics of piezoelectric constant d31=250 pm/V. In a preferable configuration, the piezoelectric thin film is directly formed on the substrate by a gas phase growth method and a sol-gel method or the like. In particular, as the piezoelectric layer of this embodiment, it is preferable that a thin film has a thickness of 1 μm or more and 10 μm or less.

<With Regard to the Film-Forming Method>

A gas phase growth method is preferable as the film-forming method of the piezoelectric body. For example, in addition to a sputtering method, various methods may be adopted such as ion plating method, MOCVD method (metalorganic chemical vapor deposition), and PLD method (pulsed laser deposition method). In addition, use of methods other than the gas phase growth method may be contemplated (for example, sol-gel method and the like).

It is made possible to simplify the production process by performing film-forming of the PZT thin film directly on the substrate by the sputtering method and film-thinning of the piezoelectric body. In addition, the piezoelectric-body thin film obtained in this manner is readily subjected to fine processing by etching or the like, and can be patterned in a desired shape. By virtue of this, yield is considerably improved and it is made possible to respond to further device miniaturization.

In working of the present invention, substrate materials, electrode materials, piezoelectric materials, film thicknesses, film-forming conditions, and the like may be selected as appropriate in accordance with the purposes.

Modified Example

Although the diaphragm part that has the circular shape in a plan view has been described with reference to FIG. 1, but the shape is not limited to the circular shape and other configurations are possible such as a diaphragm part in an elliptical shape in a plan view and a diaphragm part in a polygonal shape in a plan view.

The present invention is not limited to the above-described embodiments and various modifications may be made thereto by those skilled in the art without departing from the technical idea of the present invention.

What is claimed is:

1. An angular velocity sensor comprising:
   a flexible diaphragm part including a laminated structure, the laminated structure of the diaphragm part including an upper electrode, a piezoelectric layer, a lower electrode, and one or more vibration plate layers, the upper electrode including a driving electrode part and a detection electrode part, the driving electrode part and the detection electrode part being pattern-arranged;
   a pedestal section configured to support an outer circumference of the diaphragm part; and
   a weight section joined to a central part of the diaphragm part,
   the angular velocity sensor being configured to cause the weight section to vibrate using an inverse piezoelectric effect of a piezoelectric body by applying an electric field to the piezoelectric layer via the driving electrode part, and detect a displacement generated in the weight section based on a Coriolis force, the displacement being detected by a piezoelectric effect from the detection electrode part,
   the vibration plate layer being formed by a thin film forming technique, and
   when a resonance frequency in a resonance vibration mode calculated from dimensions of a structural body of the angular velocity sensor and an elastic parameter of a material of the structural body is f kilohertz, a mass of the weight section is M milligrams, a circumferential length of the diaphragm part is r meters, a stress acting on the piezoelectric layer is $\sigma_P$ pascals, a film thickness of the piezoelectric layer is $t_P$ meters, a stress acting on an n-th layer of a vibration plate portion constituted by a plurality of layers including the lower electrode and the one or more vibration plate layers is $\sigma_n$ pascals, the n-th layer being n-th from a side of the weight section, and a film thickness of the n-th layer being $t_n$ meters, and when n is a natural number, then, an effective tension, $T_{eff}$ that is expressed by an expression:

$$T_{eff} = \frac{r\left(\sigma_p t_p + \sum_n \sigma_n t_n\right)}{M}$$

satisfies:

$$\frac{-0.36f^2 + 210}{33} \leq T_{eff} \leq \frac{0.44f^2 + 210}{33}.$$

2. The angular velocity sensor as set forth in claim 1, wherein a following expression is satisfied:

$$\frac{-0.28f^2 + 210}{33} \leq T_{eff} \leq \frac{0.32f^2 + 210}{33}.$$

3. The angular velocity sensor as set forth in claim 1, wherein a following expression is satisfied:

$$\frac{-0.19f^2 + 210}{33} \le T_{eff} \le \frac{0.21f^2 + 210}{33}.$$

4. The angular velocity sensor as set forth in claim 1, wherein a thickness of the vibration plate layer is equal to or less than 5 micrometers.

5. The angular velocity sensor as set forth in claim 1, wherein a vibration mode having the resonance frequency f is a mode of vibration in which the weight section makes translational movement in a film thickness direction.

6. The angular velocity sensor as set forth in claim 1, wherein the vibration plate layer is a film formed by a gas phase film forming.

7. The angular velocity sensor as set forth in claim 1, wherein the piezoelectric layer is a thin film formed by a sputtering method.

8. The angular velocity sensor as set forth in claim 1, wherein the piezoelectric layer is one or more than two perovskite-type oxides expressed by a following expression:

general expression $ABO_3$, wherein A is an A-site element that is at least one element including Pb;
B is a B-site element that is at least one element selected from a group of Ti, Zr, V, Nb, Ta, Sb, Cr, Mo, W, Mn, Sc, Co, Cu, In, Sn, Ga, Zn, Cd, Fe, and Ni;
O is an oxygen element;
a mol ratio of the A-site element, the B-site element, and the oxygen element is 1:1:3 as a standard, and the mol ratio thereof may be deviated from a reference mol ratio as long as a perovskite structure is obtained.

9. The angular velocity sensor as set forth in claim 1, wherein the piezoelectric layer is one or more than two perovskite-type oxides expressed by a following expression:

$A_a(Zr_x,Ti_y,M_{b-x-y})_bO_c$, wherein A is an A-site element that is at least one element including Pb;
M is at least one element selected from a group of V, Nb, Ta, and Sb,
a, b, c, x, and y are numbers in the above expression, such that
0<x<b; 0<y<b, and 0≤b−x−y; and
a mol ratio of a:b:c=1:1:3 is a standard, and the mol ratio thereof may be deviated from a reference mol ratio as long as a perovskite structure is obtained.

10. The angular velocity sensor as set forth in claim 1, wherein the vibration plate layer is obtained by being formed on a silicon substrate; and
the weight section and the pedestal section are configured by remaining portions of the silicon substrate, the remaining portions being obtained as a result of removing a part of the silicon substrate having the vibration plate layer formed thereupon.

11. The angular velocity sensor as set forth in claim 1, wherein the diaphragm part has an outer circumferential shape that is a circular shape or an elliptical shape in a plan view; and
the weight section is arranged at a concentric position of the circular shape or the elliptical shape sharing a central axis with the diaphragm part.

12. A method for manufacturing an angular velocity sensor, the angular velocity sensor including a flexible diaphragm part including a laminated structure, the laminated structure of the diaphragm part including an upper electrode, a piezoelectric layer, a lower electrode, and one or more vibration plate layers, the upper electrode including a driving electrode part and a detection electrode part, the driving electrode part and the detection electrode part being pattern-arranged;
a pedestal section configured to support an outer circumference of the diaphragm part; and
a weight section joined to a central part of the diaphragm part,
the angular velocity sensor causing the weight section to vibrate using an inverse piezoelectric effect of a piezoelectric body by applying an electric field to the piezoelectric layer via the driving electrode part, and detecting a displacement generated in the weight section on the basis of a Coriolis force, the displacement being detected by a piezoelectric effect from the detection electrode part;
the vibration plate layer being formed by a thin film forming technique;
the method comprising:
forming the one or more vibration plate layers using a thin film forming technique; and
when a resonance frequency in a resonance vibration mode calculated from dimensions of a structural body of the angular velocity sensor and an elastic parameter of a material of the structural body is f kilohertz, a mass of the weight section is M milligrams, a circumferential length of the diaphragm part is r meters, a stress acting on the piezoelectric layer is $\sigma_P$ pascals, a film thickness of the piezoelectric layer is $t_P$ meters, a stress acting on an n-th layer of a vibration plate portion constituted by a plurality of layers including the lower electrode and the one or more vibration plate layers is $\sigma_n$ pascals, the n-th layer being n-th from a side of the weight section, and a film thickness of the n-th layer being to meters, and when n is a natural number, adjusting $\sigma_P$, $\sigma_n$, $t_n$, and $t_P$ such that an effective tension, $T_{eff}$ that is expressed by the expression:

$$T_{eff} = \frac{r\left(\sigma_p t_p + \sum_n \sigma_n t_n\right)}{M}$$

satisfies:

$$\frac{-0.36f^2 + 210}{33} \le T_{eff} \le \frac{0.44f^2 + 210}{33}.$$

* * * * *